United States Patent
Misawa et al.

(10) Patent No.: US 11,126,783 B2
(45) Date of Patent: Sep. 21, 2021

(54) OUTPUT APPARATUS AND NON-TRANSITORY COMPUTER READABLE MEDIUM

(71) Applicant: FUJIFILM Business Innovation Corp., Tokyo (JP)

(72) Inventors: Shotaro Misawa, Kanagawa (JP); Tomoko Ohkuma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/734,375

(22) Filed: Jan. 5, 2020

(65) Prior Publication Data
US 2021/0089703 A1  Mar. 25, 2021

(30) Foreign Application Priority Data
Sep. 20, 2019  (JP) .............................. JP2019-171713

(51) Int. Cl.
| | | |
|---|---|---|
| G06F 17/00 | (2019.01) | |
| G06F 40/10 | (2020.01) | |
| G06F 40/279 | (2020.01) | |
| G06N 20/20 | (2019.01) | |
| G06N 3/08 | (2006.01) | |
| G06K 9/62 | (2006.01) | |

(52) U.S. Cl.
CPC ............ *G06F 40/10* (2020.01); *G06F 40/279* (2020.01); *G06K 9/6215* (2013.01); *G06N 3/08* (2013.01); *G06N 20/20* (2019.01)

(58) Field of Classification Search
CPC ........ G06F 40/10; G06F 40/279; G06F 40/56; G06K 9/6215; G06N 3/08; G06N 20/20
See application file for complete search history.

(56) References Cited

U.S. PATENT DOCUMENTS

| | | | |
|---|---|---|---|
| 9,449,080 B1* | 9/2016 | Zhang | G06F 16/3331 |
| 2003/0163790 A1* | 8/2003 | Murata | G06F 16/345 |
| | | | 715/210 |
| 2004/0044952 A1* | 3/2004 | Jiang | G06F 40/205 |
| | | | 715/256 |
| 2005/0050469 A1* | 3/2005 | Uchimoto | G06F 40/56 |
| | | | 715/256 |
| 2005/0120011 A1* | 6/2005 | Dehlinger | G06F 40/205 |
| 2007/0094183 A1* | 4/2007 | Paek | G06F 16/334 |
| | | | 706/45 |
| 2011/0112826 A1* | 5/2011 | Wang | G06F 40/30 |
| | | | 704/9 |
| 2011/0219012 A1* | 9/2011 | Yih | G06F 16/00 |
| | | | 707/749 |

(Continued)

FOREIGN PATENT DOCUMENTS

| | | |
|---|---|---|
| JP | 3921523 | 5/2007 |
| JP | 2008250893 | 10/2008 |
| JP | 2018081559 | 5/2018 |

*Primary Examiner* — Laurie A Ries
(74) *Attorney, Agent, or Firm* — JCIPRNET

(57) ABSTRACT

An output apparatus includes a processor configured to receive an input word expressing a feature of a matter; and, by inputting the input word to a generation model trained on relation between a feature term extracted based on a descriptive text describing the matter and an associative text associated with the matter, the associative text being generated from the descriptive text describing the matter, output an associative text corresponding to the input word.

18 Claims, 11 Drawing Sheets

(56) References Cited

U.S. PATENT DOCUMENTS

| | | | |
|---|---|---|---|
| 2017/0200066 A1* | 7/2017 | Wang | G06N 3/08 |
| 2017/0300563 A1* | 10/2017 | Kao | G06F 16/345 |
| 2018/0137051 A1* | 5/2018 | Tsushita | G06F 1/3275 |
| 2018/0190249 A1* | 7/2018 | Roblek | G06F 40/169 |
| 2019/0065459 A1* | 2/2019 | Andrews | G06F 40/289 |
| 2019/0129749 A1* | 5/2019 | White | G06Q 10/109 |
| 2019/0138095 A1* | 5/2019 | Visser | G10L 15/24 |
| 2020/0104410 A1* | 4/2020 | Lee | G06F 16/313 |
| 2020/0242197 A1* | 7/2020 | Srinivasan | G06F 40/258 |
| 2021/0027141 A1* | 1/2021 | MacAvaney | G06F 40/279 |

\* cited by examiner

FIG. 5

A dera wa 790 nen ni konryu sareta jiin dearu.
(Temple A is a temple built in 790.)

Showa 25 nen ni shoshitsu shi, sonogo, Showa 60 nen ni saiken sareta.
(It was burnt down in 1950 and then rebuilt in 1985.)

Aki niwa ennai no mein dori ni aru oyoso 300 pon
no kaede ga koyo shi, hitobito wo miryo shite iru.
(In autumn, about 300 persimmons on the main street in the temple
garden turn red to become autumn leaves, attracting people.)

⇩

EXTRACTION MODEL — 18

⇩

KOYO (AUTUMN LEAVES)
JIIN (TEMPLE)

FIG. 13

Entered word(s): jiin (temple), koyo (autumn leaves)

Candidate 1: Predicted number of views = 30,000 views
Minamo ni utsuru migoto na koyo!
(Fantastic autumn leaves reflected on the water!)
Yuttari shita toki wo sugosemasu.
(You can spend a relaxing time.)

Candidate 2: Predicted number of views = 20,000 views
Migoto na koyo wo rekishi aru tatemono to tomo ni tanoshimo!
(Let's enjoy the fantastic autumn leaves with the historical building!)

→ Warning: There is a similar catch-phrase.
Migoto na koyo wo tatemono to tomo ni tanoshimo!
(Let's enjoy the fantastic autumn leaves with the building!)
(Posted on Company Z's poster in 2018)

32

OUTPUT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-171713 filed Sep. 20, 2019.

BACKGROUND

(i) Technical Field

The present disclosure relates to an output apparatus and a non-transitory computer readable medium.

(ii) Related Art

Japanese Unexamined Patent Application Publication No. 2018-81559 discloses an information processing apparatus including: a central processing unit; a storage device that stores a first command group and a second command group in a storage area to which a certain address range in an address space accessible to the central processing unit is assigned; and a circuit that executes certain arithmetic processing in accordance with an address assigned in the address space. The central processing unit includes: a program counter that specifies an address in the address space; a controller that outputs to the program counter an address obtained as a result of executing the first command group; and memory that stores, in association with an address that serves as a first address and that is used for executing the second command group, an address assigned to the circuit as a second address. The information processing apparatus includes a converter that, in a case where an address output by the controller matches the first address, outputs the second address to the program counter.

Japanese Unexamined Patent Application Publication No. 2008-250893 discloses an information searching program for generating, in response to a query input from a learner's computer, a keyword for searching for information regarding the query, and searching for the information. The program causes a computer device to function as: an output unit that outputs a first learning area extracted from a teaching material including a plurality of divided learning areas to a learner's terminal; a query receiving unit that receives an input of a query from the learner; a first keyword extracting unit that extracts a first keyword for a search by conducting a morphological analysis of a query received by the query receiving unit; a second keyword extracting unit that refers to an important word defining table that stores, among keywords in the first learning area output from the output unit, an important keyword to be added to the first keyword for searching for the information regarding the query, and extracts the important keyword as a second keyword; and a search unit that searches for the information regarding the query by using both the first keyword and the second keyword.

Japanese Patent No. 3921523 discloses a text generating method for generating a text including one or more sentences, the method including: inputting, by an input unit, one or more words that serve as one or more keywords; extracting, by an extracting unit, texts regarding the keyword(s) from a database; and generating, by a text generating unit including an analyzing unit and a dependency structure forming unit, a text using the input keyword(s) by combining the extracted texts in accordance with a partial dependency relationship included in each of the texts. In the generating, the analyzing unit performs a morphological analysis and a syntax analysis of each of the extracted texts to obtain the text's dependency structure; and the dependency structure forming unit extracts a plurality of partial dependency relationships between at least one node including a keyword in the dependency structure and other nodes, and combines the partial dependency relationships to form a dependency structure of one whole sentence including the keyword(s), thereby generating a text.

There has been available an output apparatus for outputting, on the basis of a text describing a matter (hereinafter referred to as a descriptive text), a text associated with the matter (hereinafter referred to as an associative text).

However, in order for such an output apparatus to output an associative text, the user may need to create a descriptive text with a sufficient amount of information for generating an associative text (for example, a plurality of sentences describing the features of a matter), which takes time and labor for the user. Therefore, it has been demanded to output an associative text even from a descriptive text (such as a word or words) that only has an insufficient amount of information for generating an associative text.

SUMMARY

Aspects of non-limiting embodiments of the present disclosure relate to providing an output apparatus and a non-transitory computer readable medium for automatically generating and outputting an associative text on receipt of a descriptive text describing a matter even in the case where an associative text associated with the matter is not generatable only with information contained in the descriptive text.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an output apparatus including a processor configured to receive an input word expressing a feature of a matter; and, by inputting the input word to a generation model trained on relation between a feature term extracted based on a descriptive text describing the matter and an associative text associated with the matter, the associative text being generated from the descriptive text describing the matter, output an associative text corresponding to the input word.

BRIEF DESCRIPTION OF THE DRAWINGS

An exemplary embodiment of the present disclosure will be described in detail based on the following figures, wherein:

FIG. 5 is a diagram illustrating an example in which feature terms are extracted from a descriptive text by applying an unsupervised feature term extracting method;

FIG. 13 is a diagram illustrating an exemplary output screen for prompting the user to correct a catch-phrase.

DETAILED DESCRIPTION

Hereinafter, an exemplary embodiment of the present disclosure will be described with reference to the drawings. Note that the same elements and the same processes are given the same symbols throughout the drawings, and overlapping descriptions are omitted.

Figure 1:
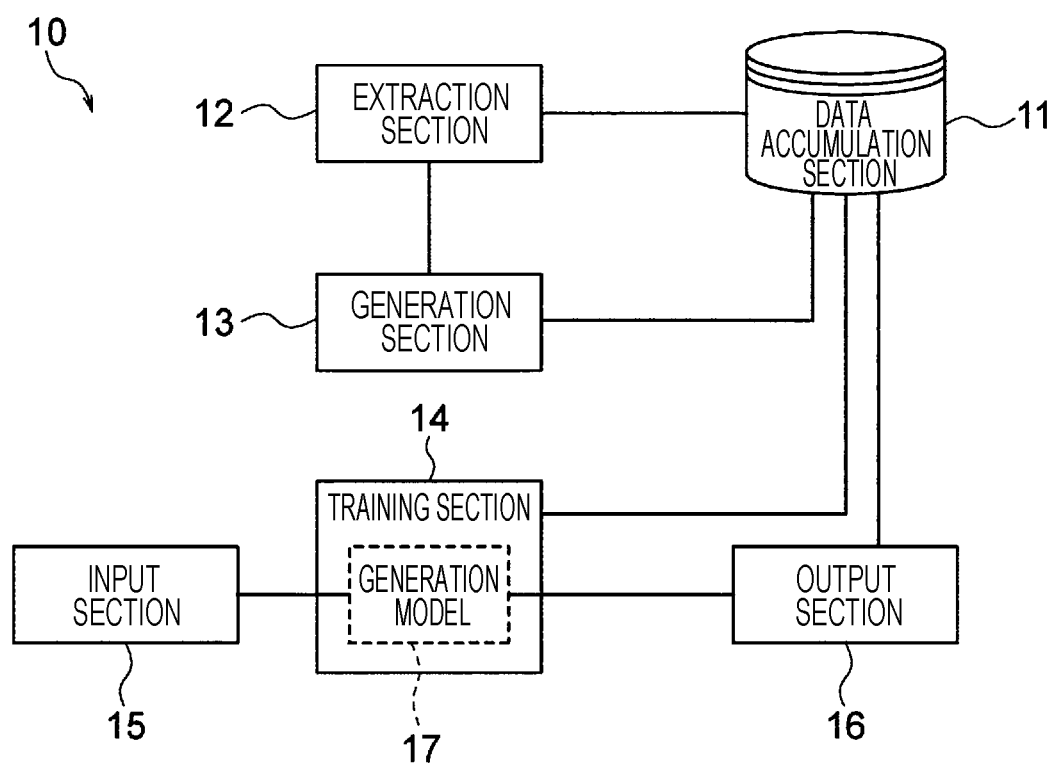
FIG. 1 is a diagram illustrating an exemplary functional configuration of an output apparatus.

FIG. 1 is a diagram illustrating an exemplary functional configuration of an output apparatus 10 according to the present exemplary embodiment. The output apparatus 10 includes the following functional sections: a data accumulation section 11, an extraction section 12, a generation section 13, a training section 14, an input section 15, and an output section 16. The training section 14 includes a generation model 17 serving as a target to be trained.

The data accumulation section 11 accumulates data (hereinafter referred to as "pair data") that relates a descriptive text, which is a text describing a matter, and an associative text, which is a text associated with the matter described by the descriptive text.

A descriptive text includes one or more sentences or one or more words that describe the situation or features of a matter. For example, as a descriptive text of temple A, sentences such as "A dera wa 790 nen ni konryu sareta jiin dearu. (Temple A is a temple built in 790.) Showa 25 nen ni shoshitsu shi, sonogo, Showa 60 nen ni saiken sareta. (It was burnt down in 1950 and then rebuilt in 1985.) Aki niwa ennai no mein dori ni aru oyoso 300 pon no kaede ga koyo shi, hitobito wo miryo shite iru. (In autumn, about 300 persimmons on the main street in the temple garden turn red to become autumn leaves, attracting people.)" are used.

An associative text includes one or more sentences or one or more words associated with a descriptive text. An associative text may be composed of an unrestricted number of characters as long as it is a text associated with a related descriptive text, and may have more or fewer characters than its related descriptive text. Hereinafter, an example will be described in which, as an exemplary associative text, a catch-phrase for a matter expressed in a descriptive text is related to the descriptive text, and is accumulated in the data accumulation section 11 along with the descriptive text.

A catch-phrase is an example of an associative text, and includes one or more sentences or one or more words summarizing the features of a matter using eye-catching expressions in order to impress users with the existence of the matter. For example, for the above-mentioned descriptive text of temple A, sentences such as "Taimu surippu shitaka no yo! (It seems as if we've gone back in time!) Rekishi kanjiru A dera de koyo wo tanoshimo! (Let's enjoy the autumn leaves at historical temple A!)" are a catch-phrase for the matter described in the descriptive text.

Such a catch-phrase may be created by the user from a descriptive text. However, a generation apparatus (not illustrated) for automatically generating, in response to an input of a descriptive text created by the user, a catch-phrase related to the input descriptive text may be used. This unillustrated generation apparatus includes a model for generating a catch-phrase from a descriptive text. For convenience of description, this model included in the unillustrated generation apparatus for generating a catch-phrase from a descriptive text is referred to as a different generation model 19 in order to be distinguished from the generation model 17 in the output apparatus 10.

The extraction section 12 obtains a descriptive text from each item of pair data accumulated in the data accumulation section 11, and extracts one or more feature terms from the obtained descriptive text. A feature term refers to words and phrases that express the features of a matter described in a descriptive text more clearly than other words and phrases included in the descriptive text. Words and phrases include words, which are the smallest units for composing sentences; clauses, which are units demarcated into meaningful ranges; character-delimited text; and sub-words (for example, affixes such as "pre" and "tion" in English). Therefore, although the extraction section 12 may extract feature terms in units of clauses, an example in which feature terms are extracted in units of words will be described hereinafter.

The generation section 13 generates training data for the generation model 17 by relating feature terms extracted by the extraction section 12 to a catch-phrase related to a descriptive text from which the feature terms are extracted. The generation section 13 accumulates the generated training data in the data accumulation section 11. In this case, the generation section 13 may accumulate, in the data accumulation section 11, the generated training data further in relation to pair data including the descriptive text from which the feature terms included in the training data are extracted.

Using items of training data generated by the generation section 13, the training section 14 trains the generation model 17 on the relation between feature terms and catch-phrases. The generation model 17 is composed of, for example, a neural network. The generation model 17 repeatedly executes machine learning that uses feature terms as input and a catch-phrase related to the input feature terms as teaching data, thereby performing learning so as to reduce an error between a catch-phrase output from the generation model 17 and the catch-phrase serving as the teaching data.

The input section 15 receives information from a user who wants to generate a catch-phrase using the output apparatus 10. Specifically, the input section 15 receives a word that expresses a feature of a matter for which the user wants to generate a catch-phrase. The user may express a feature of a matter for which a catch-phrase is to be generated in plural words. Hereinafter, at least one word that the user inputs to the input section 15 will be referred to as a user word. A user word is an example of an input word according to the present exemplary embodiment.

In the case where the extraction section 12 extracts feature terms in units of clauses and the training section 14 trains the generation model 17 on the relation between feature terms in units of clauses and a catch-phrase, the input section 15 may receive an input word in units of clauses from the user.

A user word received by the input section 15 is input to the generation model 17, and the output section 16 is notified of a catch-phrase generated by the generation model 17 in response to the input user word.

The output section 16 converts a catch-phrase received from the generation model 17 to a user-recognizable format, and outputs the converted catch-phrase. Specifically, the output section 16 outputs a catch-phrase using at least one of the following forms: the form of displaying the catch-phrase on a screen; the form of notifying the user of the catch-phrase by voice or sound; the form of printing the catch-phrase as characters on a recording medium such as a paper sheet; and the form of storing the catch-phrase in a user-readable storage medium.

Next, an exemplary configuration of main portions of the electrical system of the output apparatus 10 will be described.

Figure 2:
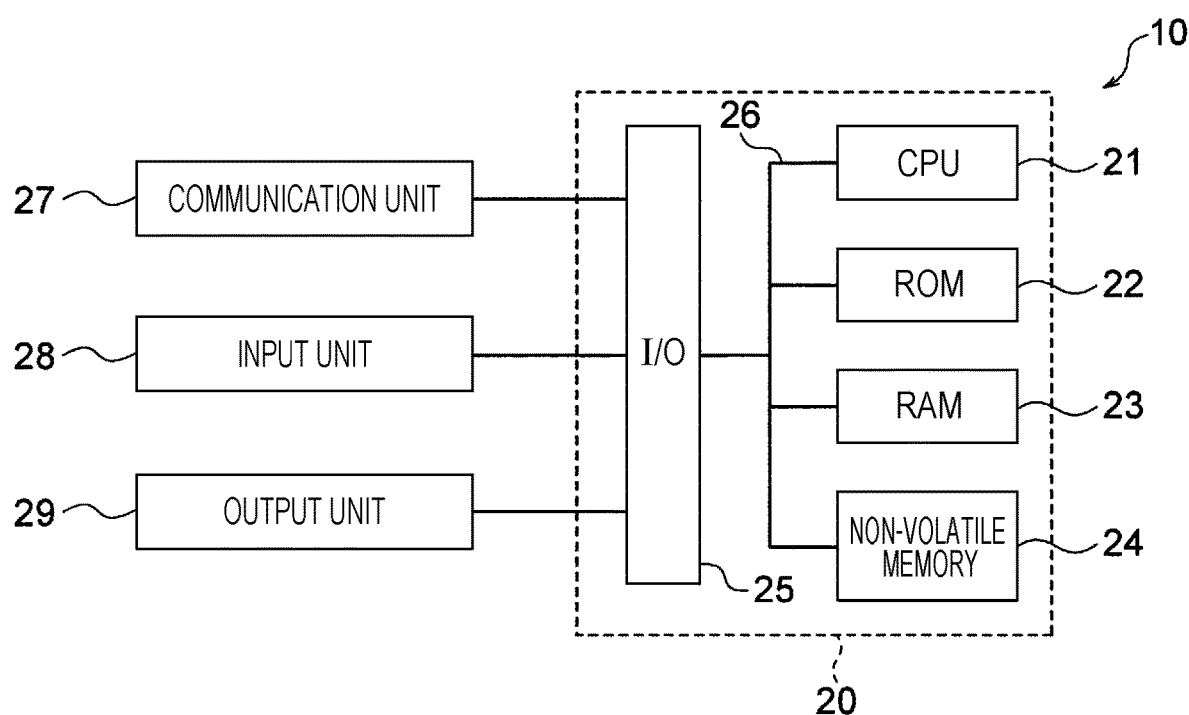
FIG. 2 is a diagram illustrating an exemplary configuration of main portions of the electrical system of the output apparatus.

FIG. 2 is a diagram illustrating an exemplary configuration of main portions of the electrical system of the output apparatus 10. The output apparatus 10 is configured using, for example, a computer 20.

The computer 20 includes the following: a central processing unit (CPU) 21, which is an example of a processor that serves as functional sections according to the output apparatus 10 illustrated in FIG. 1; read-only memory (ROM) 22, which stores an output program for causing the computer 20 to function as the functional sections illustrated in FIG. 1; random-access memory (RAM) 23, which is used as a temporary work area for the CPU 21; non-volatile memory 24; and an input/output interface (I/O) 25. The CPU 21, the ROM 22, the RAM 23, the non-volatile memory 24, and the I/O 25 are connected to one another via a bus 26.

The non-volatile memory 24 is an example of a storage device that maintains its stored information even when power supplied to the non-volatile memory 24 is cut off. For example, semiconductor memory is used as the non-volatile memory 24. Alternatively, a hard disk drive may be used as the non-volatile memory 24. The non-volatile memory 24 need not be included in the computer 20. The non-volatile memory 24 may be a portable storage device attached to and detached from the computer 20, such as a memory card or a universal serial bus (USB) flash drive. The data accumulation section 11 is configured in, for example, the non-volatile memory 24.

In contrast, for example, a communication unit 27, an input unit 28, and an output unit 29 are connected to the I/O 25.

The communication unit 27 is connected to a communication line (not illustrated), and is provided with a communication protocol for performing data communication with an external apparatus connected to a communication line (not illustrated).

The input unit 28 is a device that receives a command from the user and notifies the CPU 21 of the command, and, for example, a button, a touchscreen, a keyboard, and/or a mouse is used as the input unit 28. In the case of making a command by voice, a microphone may be used as the input unit 28.

The output unit 29 is a device that outputs information processed by the CPU 21, and, for example, a liquid crystal display (LCD), an organic electro-luminescence (EL) display, a projector, a printer, and/or a loudspeaker is used as the output unit 29 in accordance with the output form that the user desires.

Note that units connected to the I/O 25 are not restricted to those units illustrated in FIG. 2, and other units such as an external storage unit may be connected to the I/O 25 as needed.

Next, the operation of the output apparatus 10 will be described.

Figure 3:
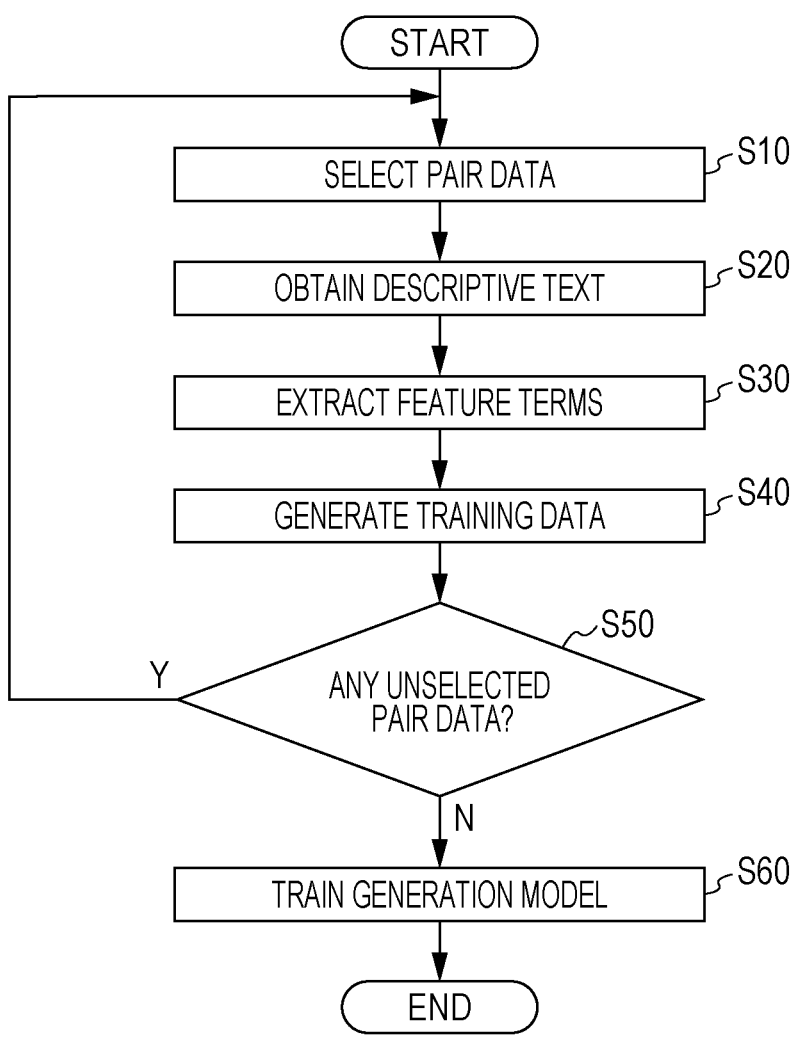
FIG. 3 is a flowchart illustrating an exemplary flow of a training process.

FIG. 3 is a flowchart illustrating an example of the flow of a training process executed by the CPU 21 of the output apparatus 10. An output program that defines the training process is stored in advance in, for example, the ROM 22 of the output apparatus 10. The CPU 21 of the output apparatus 10 reads the output program stored in the ROM 22 and executes the training process. The CPU 21 may start the training process illustrated in FIG. 3 at any time point; however, it is assumed by way of example that the CPU 21 executes the training process on receipt of a command from the user to train the generation model 17.

In step S10, the CPU 21 selects any of items of pair data stored in the non-volatile memory 24.

In step S20, the CPU 21 obtains a descriptive text from the pair data selected in step S10.

In step S30, the CPU 21 extracts feature terms from the descriptive text obtained in step S20. There are various models for an extraction model 18 for extracting feature terms from a descriptive text.

In the case where there is feature term information that is information generated in the course of training the different generation model 19 for generating a catch-phrase from a descriptive text and that defines feature terms in a descriptive text, the CPU 21 simply refers to the feature term information and extracts feature terms from the descriptive text.

For example, in the case where the different generation model 19 includes an attention mechanism, for every word included in a descriptive text input to the different generation model 19, that word's impact on generating a catch-phrase is output. Words that have a greater impact on generating a catch-phrase are words that express the features of a matter and are considered to be important words. Thus, among words included in a descriptive text, the CPU 21 simply regards words extracted in descending order of impact on generating a catch-phrase as feature terms. That is, the impact of each word, which is output by the different generation model 19 with an attention mechanism, is an example of feature term information and represents the importance of that word in the descriptive text.

Although there is no restriction on the number of feature terms to be extracted from a descriptive text, the CPU 21 simply extracts words whose impacts are greater than or equal to a predetermined reference impact as feature terms. In addition, the CPU 21 simply restricts the number of feature terms to be extracted to a pre-specified number, and extracts words the number of which is less than or equal to the specified number in descending order of impact as feature terms. The reference impact and the number of words to be extracted are set by the user through the input unit 28.

The different generation model 19 may be configured in a generation apparatus (not illustrated) other than the output apparatus 10, or in the output apparatus 10.

Figure 4:
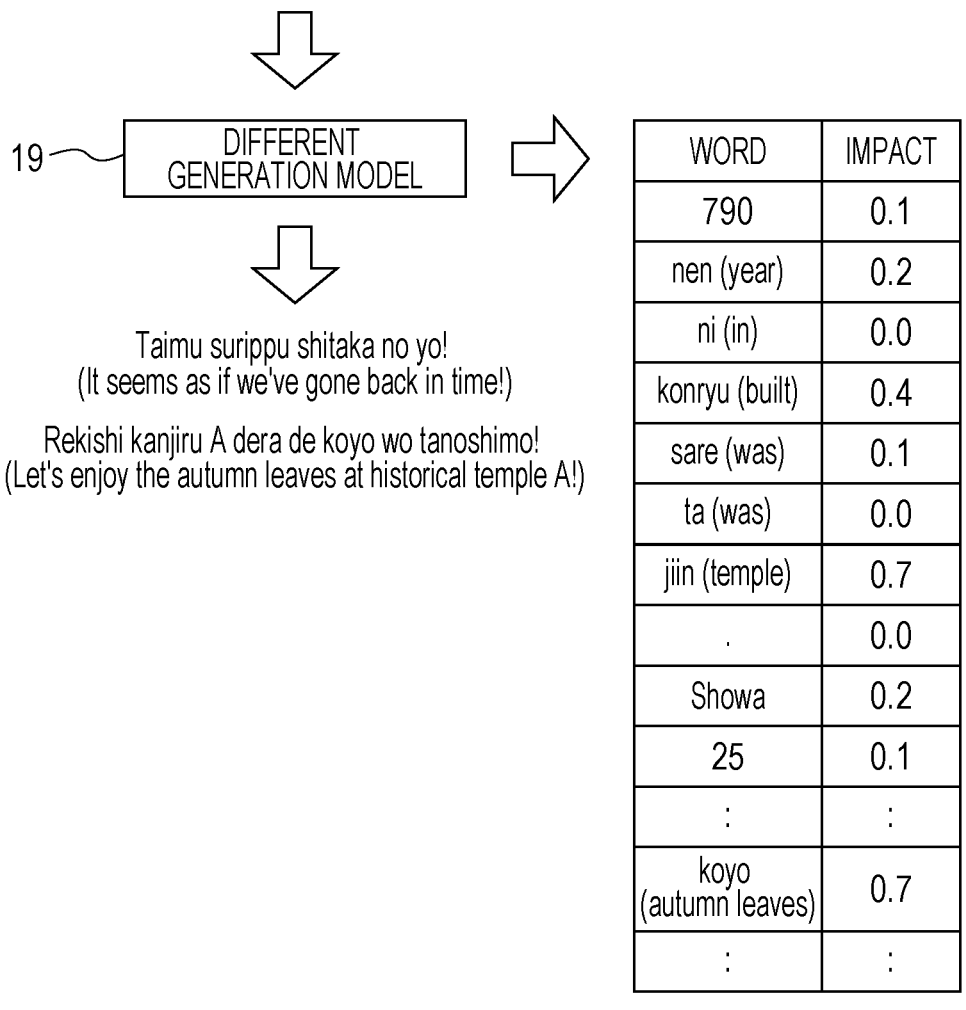
FIG. 4 is a descriptive diagram describing an extraction model for extracting feature terms from a descriptive text using the impact of each word.

FIG. 4 is a descriptive diagram describing the extraction model 18 for extracting feature terms from a descriptive text using the impact of each word, which is output by the different generation model 19 with an attention mechanism. For example, in the case where the impacts of words obtained from a descriptive text are values as illustrated in FIG. 4, if words whose impacts are greater than or equal to the reference impact are "koyo (autumn leaves)" and "jiin (temple)", the CPU 21 extracts "koyo (autumn leaves)" and "jiin (temple)" from the descriptive text as feature terms.

In contrast, in the case where the different generation model 19 does not have a mechanism for outputting the impact of a word on a catch-phrase, as in an attention mechanism, or there is no different generation model 19 for generating a catch-phrase from a descriptive text in the first place, the CPU 21 simply calculates the impact of each word included in a descriptive text from the details of the descriptive text and extracts feature terms in accordance with the impact of each word.

Specifically, on the basis of the idea that words that appear more frequently in a descriptive text are more important words, and words that are used in many descriptive texts are considered to be more general words and are thus not important words expressing the features of the descriptive text, the CPU 21 simply uses Term Frequency-Inverse Document Frequency (tf-idf) for calculating the importance of every word in a descriptive text to extract words whose importance is greater than or equal to predetermined reference importance as feature terms. In addition, the CPU 21 may represent a descriptive text in a graph structure in which each word serves as a node on the basis of the dependency relationship of words in the descriptive text, and, using a known method such as Text Rank for extracting important words from a descriptive text, extract feature terms from the descriptive text.

Instead of extracting feature terms from a descriptive text using pair data, as in the different generation model 19 with an attention mechanism, a method of extracting feature terms only from a descriptive text may be referred to as an "unsupervised feature term extracting method". Examples of an unsupervised feature term extracting method include tf-idf and Text Rank.

FIG. 5 is a diagram illustrating an example in which feature terms are extracted from a descriptive text by applying an unsupervised feature term extracting method to the extraction model 18. FIG. 5 illustrates the case in which "koyo (autumn leaves)" and "jiin (temple)" whose importance is greater than or equal to the reference importance are extracted as feature terms from the descriptive text illustrated by way of example.

The CPU 21 may input words extracted from a descriptive text as feature term candidates to the generation model 17, and regard, as feature terms, combinations of words causing a smaller loss indicating an error between a catch-phrase output by the generation model 17 and a catch-phrase related in advance to the descriptive text from which the words are extracted. A loss for the generation model 17 is a value obtained in the course of training the generation model 17 which tries to output, in response to an input word(s), a catch-phrase related in advance to a descriptive text from which the word(s) is/are extracted. For example, the following extraction model 18 is conceivable in which a loss obtained by the generation model 17 is sent as a feedback to Bidirectional Long-Short Term Memory-Conditional Random Field (Bi-LSTM-CRF), which captures bidirectional contextual information and outputs the importance of each word included in a descriptive text, thereby outputting the importance of each word.

Alternatively, the following extraction model 18 is conceivable in which, after the features of a descriptive text are converted to intermediate representations, a loss obtained by the generation model 17 is sent as a feedback to an encoder-decoder model using a recurrent neural network for outputting feature terms of the descriptive text on the basis of the intermediate-representation-encoded descriptive text and attention, thereby outputting the importance of each word.

In the case where feature terms are extracted as above, extraction of feature terms from a descriptive text and training of the generation model 17 are performed at the same time, thereby improving the efficiency of the training process, compared with the case of separately performing extraction of feature terms and training of the generation model 17.

In the case where Bi-LSTM-CRF is used in the extraction model 18, the importance of every word included in a descriptive text is output; thus, feature terms are extracted from words included in a descriptive text. In contrast, in the case where a decoder is included in the extraction model 18, the decoder has its own dictionary and outputs appropriate words from the dictionary that correspond to an intermediate-representation-encoded descriptive text and attention. Thus, words not included in the descriptive text may also be extracted as feature terms. That is, a combination of words included in the descriptive text and words not included in the descriptive text may be extracted as feature terms.

Regarding a matter for which the user wants to create a catch-phrase, there may be descriptive texts (hereinafter referred to as "external descriptive texts") in blogs and social networking services (SNS) on the Internet. Therefore, the CPU 21 may receive external descriptive texts describing the same matter as the matter described in the descriptive text obtained in step S20, and external descriptive texts whose details are similar to those of the descriptive text obtained in step S20 via the communication unit 27, and extract feature terms from the external descriptive texts using an unsupervised feature term extracting method. The CPU 21 may regard, for example, an external descriptive text specified by the user using a uniform resource locator (URL) as an external descriptive text whose details are similar to the descriptive text obtained in step S20. Alternatively, the CPU 21 may extract feature terms by searching an external descriptive text autonomously even when not specified by the user, using a known evaluation method for evaluating the similarity between sentences.

To improve the searchability of descriptive texts, especially external descriptive texts posted on SNS, a symbol-added word, which is a word with a symbol such as the hash tag "#" added to the beginning thereof, may be used. In many cases, a symbol-added word is a word considered to be important by a user who has generated the corresponding external descriptive text. Therefore, if the CPU 21 extracts feature terms from symbol-added words, extraction of feature terms is completed more efficiently than the case in which all the words included in an external descriptive text serve as feature term candidates.

The CPU 21 may not only use the form of extracting feature terms from the descriptive text obtained in step S20, but may also regard only feature terms extracted from an external descriptive text(s) as feature terms. In addition, the CPU 21 may add at least one of feature terms extracted from an external descriptive text(s) to feature terms extracted from the descriptive text obtained in step S20.

In step S40 in FIG. 3, the CPU 21 generates training data for the generation model 17 by relating feature terms extracted in step S30 to a catch-phrase related in advance to the descriptive text from which the feature terms are extracted. In this case, the CPU 21 stores, in the non-volatile memory 24, for example, the generated training data in relation to the pair data including the descriptive text from which the feature terms included in the training data are extracted.

Note that the CPU 21 may generate training data for the generation model 17 by generating a plurality of sets of feature terms extracted from a descriptive text in which their numbers are different from one another, and relate a catch-phrase related in advance to the descriptive text from which the feature words are extracted to each of the sets of feature terms. In doing so, a plurality of items of training data reflecting various combinations of feature terms are obtained from one item of pair data.

In addition, instead of using feature terms extracted from a descriptive text as they are in training data, the CPU 21 may further select feature terms to be used for training data from the extracted feature terms. There is no restriction on the method of selecting feature terms; for example, feature terms may be selected at random. In this case, a plurality of items of training data reflecting various combinations of feature terms are obtained from one item of pair data by the method of selecting feature terms.

In step S50, the CPU 21 determines whether there is unselected pair data that has not been selected yet in step S10, among items of pair data stored in the non-volatile memory 24. When there is unselected pair data, the process proceeds to step S10 and the CPU 21 selects one item of pair data from among one or more items of pair data that have not been selected yet in step S10. By repeating the processing from step S10 to step S50 until it is determined in step S50 that there is no unselected pair data, training data in which feature terms and a catch-phrase are related to each other is generated for each of the items of pair data.

In contrast, when it is determined in step S50 that there is no unselected pair data, the process proceeds to step S60.

In step S60, using the generated items of training data, the CPU 21 trains the generation model 17 so as to output, in response to input feature terms, a catch-phrase related to the feature terms. Accordingly, the generation model 17 is obtained which generates, when the user simply inputs one or more user words considered to express the features of a matter for which the user wants to generate a catch-phrase, a catch-phrase from the input user word(s).

Note that various methods are applied to train the generation model 17. For example, in the case where the generation model 17 includes a decoder, the generation model 17 is simply trained by inputting the average of distributed representations of feature terms to the generation model 17.

Here, distributed representations of words including feature terms are an example of an intermediate representation in which a word is represented as a predetermined-dimensional real-valued vector, and a feature term is represented by being compressed into a predetermined dimension. A distributed representation of a word is obtained as, for example, an output of an embedding layer included in the generation model 17. The greater the number of items of training data for training the generation model 17, the more distributed representations of various words are obtained in the course of training the generation model 17. It is therefore sufficient for the CPU 21 to use, as distributed representations of feature terms, distributed representations that have already been learned at a certain time point by the generation model 17. In addition, because distributed representations of words are updated every time the generation model 17 is trained, the CPU 21 may use the latest distributed representations. Furthermore, every time new item of training data is added to the already-trained generation model 17 and the generation model 17 is re-trained, the CPU 21 may randomly set the initial values of distributed representations of words and use the distributed representations that are re-learned from the beginning.

Figure 6:
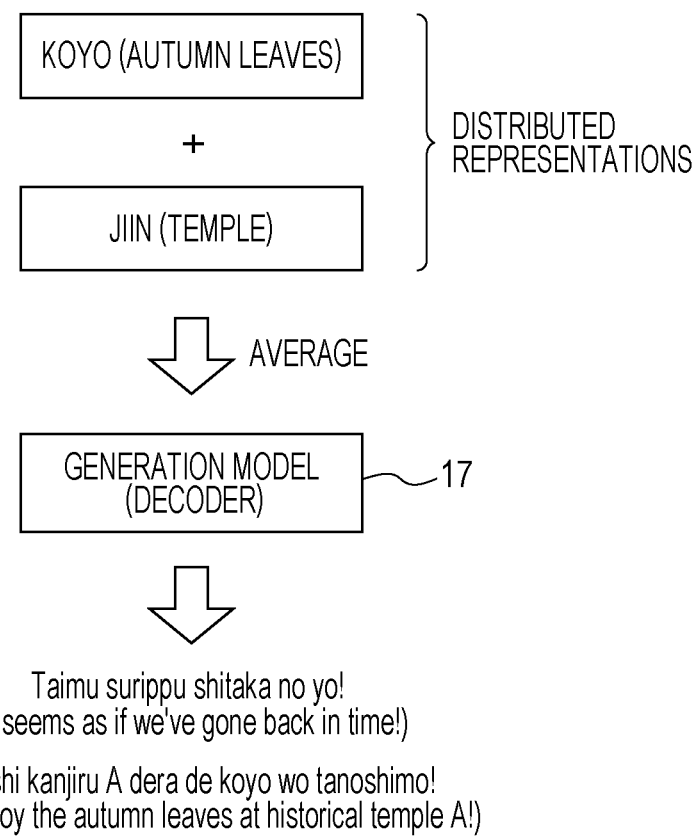
FIG. 6 is a diagram illustrating an example of learning the relation between the distributed representations of feature terms and a catch-phrase.

FIG. 6 is a diagram illustrating the situation when two feature terms, namely, "koyo (autumn leaves)" and "jiin (temple)", are input to the generation model 17 including a decoder. The feature terms "koyo (autumn leaves)" and "jiin (temple)" are input as the average of distributed representations to the generation model 17, and the generation model 17 is trained to output a catch-phrase ("It seems as if we've gone back in time! Let's enjoy the autumn leaves at historical temple A!" in the example illustrated in FIG. 6) related to the input feature terms.

At this time, the CPU 21 may weight the distributed representations of the feature terms, input the average of the weighted distributed representations of the feature terms to the generation model 17, and train the generation model 17. By weighting the distributed representations of feature terms, the degree of relation between a catch-phrase and the feature terms is adjusted. This suppresses the configuration of the generation model 17 trained to overfit to a particular feature term, such as generating a catch-phrase with similar context if a particular feature term is included, no matter what other feature term is input.

Figure 7:
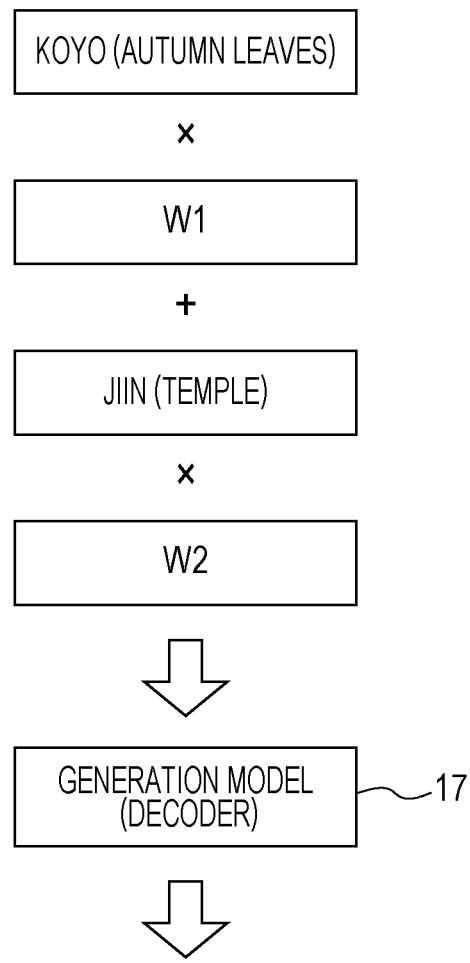
FIG. 7 is a diagram illustrating an example of learning the relation between the weighted distributed representations of feature terms and a catch-phrase.

FIG. 7 is a diagram illustrating the situation when two weighted feature terms, namely, "koyo (autumn leaves)" and "jiin (temple)", are input to the generation model 17 including a decoder. A weight W1 is the weight of "koyo (autumn leaves)", and a weight W2 is the weight of "jiin (temple)". The feature terms "koyo (autumn leaves)" and "jiin (temple)" which are respectively weighted with the weight W1 and the weigh W2 are input as the average of distributed representations to the generation model 17, and the generation model 17 is trained to output a catch-phrase related to the input feature terms.

The CPU 21 uses, for example, the importance of a feature term, which is obtained by applying tf-idf to a descriptive text from which the feature term is extracted, or the impact of a feature term, which is output by the different generation model 19 with an attention mechanism, as the weight of the feature term.

Although there is no restriction on the input order of inputting feature terms to the generation model 17, if there is any rule regarding the order of inputting feature terms, the time taken to train the generation model 17 may be reduced, or it may become easier to generate a catch-phrase that meets the user's expectations, thereby improving the effect of training the generation model 17. Therefore, the CPU 21 may determine the input order of inputting feature terms to the generation model 17 in accordance with the importance of feature terms or the impact of feature terms on a catch-phrase generated by the generation model 17. Specifically, the CPU 21 selects feature terms in descending order of importance or impact on a catch-phrase generated by the generation model 17 and inputs the feature terms to the generation model 17.

If the number of feature terms input to the generation model 17 changes, the importance of each of the feature terms may also change. In contrast, in the case where feature terms are input as distributed representations to the generation model 17, because the distributed representations of the feature terms are averaged and input to the generation model 17, the number of feature terms input to the generation model 17 becomes unknown.

Therefore, the CPU 21 may additionally input the number of feature terms input to the generation model 17, along with the feature terms, and train the generation model 17. Because the CPU 21 may use the number of input feature terms as a training parameter that affects the details of a catch-phrase generated by the generation model 17, compared with the generation model 17 in the case of training the generation model 17 without inputting the number of input feature terms to the generation model 17, the structure of the trained generation model 17 changes, which may result in obtaining the generation model 17 with a structure that easily generates a catch-phrase that meets the user's expectations from one or more user words.

In addition, in the case of training the generation model 17 using training data, as described above, it is preferable that the CPU 21 train the generation model 17 using a plurality of items of training data reflecting various combinations of feature terms from the same pair data. In this case, to prevent the relation between feature terms and a catch-phrase from being fixed, compared with the case of training the generation model 17 only from training data that has a one-to-one correspondence with pair data, the structure of the trained generation model 17 changes, which may result in obtaining the generation model 17 with a structure that easily generates a catch-phrase that meets the user's expectations from one or more user words.

In addition, the CPU 21 may train the generation model 17 using training data generated by adding a predetermined number of words randomly extracted from a descriptive text to feature terms extracted from the descriptive text by taking into consideration the importance of words or the impact of words on a catch-phrase. Although there is no guarantee that words randomly extracted from a descriptive text are words that express the features of the descriptive text, if the generation model 17 is trained using training data including the randomly extracted words, the combination of feature terms changes, which reduces the likelihood of the generation model 17 being trained to overfit to a particular feature term. Therefore, as will be described later, the generation model 17 is prevented from being built to overfit to an input particular user word such that, whatever combination of user words is input to the generation model 17, the details of a generated catch-phrase do not change.

Although the example in which the average of distributed representations of feature terms is input to the generation model 17 and the generation model 17 is trained has been described above, for example, the output of an encoder which is a mechanism that processes distributed representations and which is built using long short-term memory (LSTM) or a gated recurrent unit (GRU) may be input to the generation model 17, and the generation model 17 may be trained.

By inputting one or more words that express the features of a matter for which the user wants to generate a catch-phrase, that is, one or more user words, to the generation model 17 trained as above, a catch-phrase associated with the user word(s) is generated.

Figure 8:
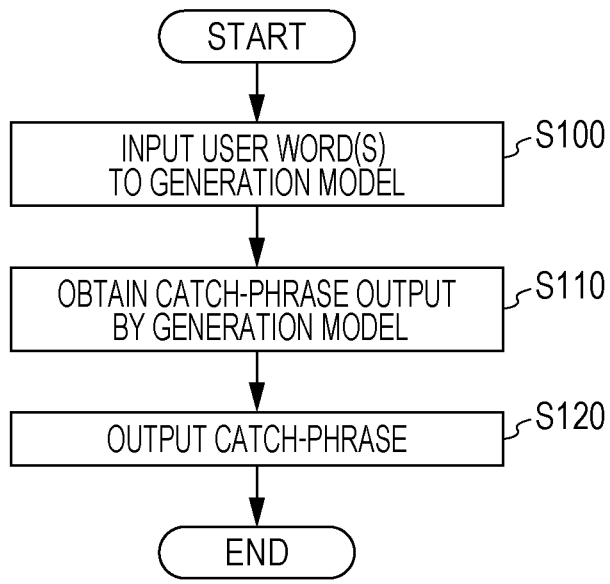
FIG. 8 is a flowchart illustrating an exemplary flow of an output process.

FIG. 8 is a flowchart illustrating an example of the flow of an output process executed by the CPU 21 of the output apparatus 10 in the case where the user inputs one or more user words to the generation model 17 that has been trained by the training process illustrated in FIG. 3. An output program that defines the output process is stored in advance in, for example, the ROM 22 of the output apparatus 10. The CPU 21 of the output apparatus 10 reads the output program stored in the ROM 22 and executes the output process.

In step S100, the CPU 21 inputs one or more user words received from the input unit 28 to the already-trained generation model 17. Accordingly, a catch-phrase corresponding to the user word(s) input to the generation model 17 is generated.

In this case, before inputting the received user word(s) to the generation model 17, the CPU 21 may output a related word which is a word different from the user word(s) received from the user and which is a word related to the user word(s). A related word is an example of a related word according to the present exemplary embodiment.

Specifically, the CPU 21 generates training data by removing, for example, at least one feature term randomly selected from feature terms included in the training data generated in step S40 of the training process illustrated in FIG. 3, and relating the remaining feature terms to the removed feature term. Using the training data, the CPU 21 trains an estimation model for estimating the removed feature term from the remaining feature terms (hereinafter referred to as a "feature term estimation model"). Moreover, the CPU 21 inputs one or more user words to the trained feature term estimation model, and obtains a word output from the feature term estimation model as a related word related to the user word(s). The CPU 21 controls the output unit 29 to display the output related word on, for example, a liquid crystal display. Because the related word representing a feature of the matter that the user is not aware of is presented by the output apparatus 10, the user simply includes the presented related information in the user word (s) and again inputs the user words to the output apparatus 10. In addition, even without any user command, the CPU 21 may combine the related word with the received user word(s) and input the combination of the received user word(s) and the related word to the generation model 17 to generate a catch-phrase. Accordingly, a catch-phrase that meets the user's expectations more than a catch-phrase generated from the originally-input user word(s) may be generated. In the case where the CPU 21 generates a catch-phrase by adding the related word to the user word(s) without a user command, the related word is output along with the catch-phrase. In the case where there is a plurality of related words, the CPU 21 may combine, for example, every combination of related words with the user word(s), and may output a catch-phrase generated by the generation model 17 for every combination.

In addition, the CPU 21 may refer to, for example, a descriptive text including the input user word(s) and output one or more words that are other than the user word(s) and that are also used in the descriptive text, that is, one or more co-occurrence words, as one or more related words.

Specifically, for every descriptive text stored in the non-volatile memory 24 as pair data, the CPU 21 generates in advance total information that totals the number of appearances of every word used in the descriptive text, and stores the total information in the non-volatile memory 24. On receipt of a user word, the CPU 21 refers to the total information, and outputs, for example, a co-occurrence word with the greatest number of appearances in the descriptive text including the user word, or a predetermined number of co-occurrence words in descending order of the number of appearances as one or more related words.

In the case of outputting one or more co-occurrence words as one or more related words, the CPU 21 may select one or more co-occurrence words to be output as one or more related words not by paying attention to the number of appearances of each co-occurrence word, but by paying attention to the distance from the distributed representation of the user word. For example, the CPU 21 compares the distributed representation of each co-occurrence word and the distributed representation of the user word, and selects a predetermined number of co-occurrence words in descending order of distance from the distributed representation of the user word as one or more related words. The distance between distributed representations is represented by, for example, a cosine distance.

By regarding a co-occurrence word whose distributed representation has a distance that is far from the user word as a related word, selection of only similar words as user words is suppressed. For example, in the case where the user word is "cheap", if the related word "low price" which is similar to "cheap" is added to the user word, a catch-phrase generated before and after adding the related word to the user word will have similar details. However, if "smile", which is a related word that is in a different viewpoint from "cheap" is added, a catch-phrase generated before and after adding the related word to the user word will tend to change, thereby widening the range of expressions of catch-phrases generated by the generation model 17.

In the case where a plurality of related words is obtained for a user word, the CPU 21 may input all the related words along with the user word to the generation model 17 to generate one catch-phrase; however, for example, the CPU 21 may change a related word to be combined with the user word to generate a plurality of catch-phrases. In the case of generating a plurality of catch-phrases as described above, if catch-phrases are generated that express a matter in different viewpoints, such as a catch-phrase emphasizing the cheapness as well as a catch-phrase emphasizing the good quality, rather than catch-phrases expressing a particular feature such as the cheapness of a matter, a wider range of selection of catch-phrases becomes available for the user, and it becomes more likely that a catch-phrase that meets the user's wises will be obtained.

Therefore, for example, the CPU 21 first generates a catch-phrase candidate for each combination of the user word and a related word by using the generation model 17 while changing the related word to be combined with the user word. Moreover, the CPU 21 may calculate the similarity for all combinations of the generated catch-phrase candidates, select a predetermined number of combinations of catch-phrases in ascending order of similarity, and output the selected combination(s) of catch-phrases as final catch-phrases.

In addition, the CPU 21 may estimate the ROUGE score for every catch-phrase candidate, which is used in the case of evaluating the summary of text such as a catch-phrase, and may output, as final catch-phrases, a predetermined number of catch-phrase candidates in descending order of ROUGE score. A ROUGE score is a known index for measuring the similarity between an existing catch-phrase and a catch-phrase generated by the generation model 17. The greater the ROUGE score, the more similar a catch-phrase generated by the generation model 17 to any of existing catch-phrases. It thus means that such a catch-phrase has a sentence structure that seems like a catch-phrase. In other words, such a catch-phrase has a high degree of perfection.

That is, the degree of perfection of a catch phrase depends on how similar the expression of a catch-phrase generated by the generation model 17 is to any of expressions used in existing catch-phrases published in, for example, newspaper, web pages, and the like. For example, catch-phrases tend to use expressions that tend to remain in human memory, such as an expression that ends with a noun or a noun phrase, as in "unforgettable autumn leaves", or an expression that uses a neologism which is not generally used, rather than an expression that clearly states a subject and a predicate, as in "autumn leaves are beautiful". A ROUGE score is an example of an index value for evaluating the degree of perfection of such a catch-phrase.

The CPU 21 inputs a catch-phrase generated by the generation model 17 using one or more user word(s) to a machine-learned degree-of-perfection estimation model trained on training data indicating the correspondence between existing catch-phrases and their ROUGE scores, and obtains the degree of perfection of the catch-phrase generated from the user word(s).

In the case where the obtained degree of perfection of the catch-phrase is less than or equal to a predetermined value, it means that the catch-phrase generated by the generation model 17 includes an expression that does not seem like a catch-phrase. For example, in the case where the number of user words input to the generation model 17 is small, the generation model 17 tends to generate a catch-phrase including an expression that does not seem like a catch-phrase. Therefore, in the case where the degree of perfection of a catch-phrase generated by the generation model 17 is less than or equal to a predetermined value, the CPU 21 may notify the user that the number of input user words is insufficient.

In addition, for example, the CPU 21 first generates a catch-phrase candidate for each combination of one or more user words and a related word by using the generation model 17 while changing the related word to be combined with the user word(s). Moreover, the CPU 21 refers to total information that totals the number of appearances of every word used in a descriptive text including the user word(s), and specifies a representative catch-phrase that is a catch-phrase candidate generated for a combination of the user word(s) and a related word that has the greatest number of appearances among related words. The CPU 21 may calculate the similarity between each catch-phrase candidate other than the representative catch-phrase and the representative catch-phrase, select a predetermined number of catch-phrase candidates in ascending order of similarity with the representative catch-phrase, and output the selected catch-phrase candidates as final catch-phrases along with the representative catch-phrase. A representative catch-phrase is an example of a reference associative text according to the present exemplary embodiment.

That is, the CPU 21 selects a related word from among a plurality of related words such that, by adding that related word to one or more user words, the similarity between catch-phrases generated by the generation model 17 will be as low as possible. Such selection of a related word is also effective in the case where, for example, the number of words to be input to the generation model 17 is restricted.

A related word that, by adding that related word to one or more user words, will generate a catch-phrase whose similarity is less than or equal to a predetermined similarity is a related word that tends to change the expression of a catch-phrase, among many related words for the received user word(s). Therefore, if the CPU 21 trains a feature term estimation model so as to output such a related word for the received user word(s), related words for generating various catch-phrases with dissimilar expressions will be obtained from the feature term estimation model.

The CPU 21 calculates the similarity between a catch-phrase generated only from one or more user words and each of catch-phrases generated by adding every combination of related words to the user word(s), and identify a related word used for generating a catch-phrase with the lowest similarity. Moreover, the CPU 21 may train the feature term estimation model so as to output the related word identified for the received user word(s).

Note that the similarity between catch-phrases may be calculated by applying an existing technique of calculating the similarity between texts. For example, the CPU 21 represents catch-phrases in terms of distributed representations, and measure the cosine distance between the distributed representations to calculate the similarity between the catch-phrases.

Furthermore, the CPU 21 may refer to, for example, a synonym dictionary that defines, for every word, a word that serves as the superordinate concept and a word that serves as the subordinate concept, and may output at least one of a word that serves as the superordinate concept and a word that serves as the subordinate concept of a user word as a related word. The CPU 21 may use a synonym dictionary provided on the Internet, such as Word Net, or an original synonym dictionary stored in the non-volatile memory 24.

In step S110, the CPU 21 obtains at least one catch-phrase selected by the user or the CPU 21 from among catch-phrases generated by the generation model 17.

In step S120, the CPU 21 controls the output unit 29 to output the catch-phrase obtained in step S110, and ends the output process illustrated in FIG. 8.

In the case where the output apparatus 10 includes, besides the generation model 17, an estimation model (referred to as a "descriptive text estimation model") for estimating, by using training data that relates a feature term extracted from a descriptive text and the descriptive text from which the feature term is extracted, the details of the descriptive text from the feature term, the CPU 21 may control the output unit 29 to output a descriptive text obtained by inputting a user word to the descriptive text estimation model, along with a catch-phrase.

If the details of an output descriptive text correctly express the matter for which a catch-phrase is to be generated, it means that a catch-phrase output along with the descriptive text is a reliable catch-phrase. Therefore, in the case were a plurality of catch-phrases is output, a descriptive text estimated by the descriptive text estimation model is useful information in selecting a catch-phrase.

In contrast, when the details of a descriptive text estimated by the output apparatus 10 using the descriptive text estimation model for an input user word does not correctly express the matter for which a catch-phrase is to be generated, a catch-phrase generated using another user word will more likely meet the user's expectations. Therefore, on receipt of a notification from the user that there is a problem in the details of the estimated descriptive text, the CPU 21 may output a notification prompting the user to correct the user word.

As described above, there are cases in which, when the user conceives various user words for a matter for which a catch-phrase is to be generated, the user sequentially inputs the conceived user words to the output apparatus 10 to see what catch-phrase is output for which user word. In contrast, it is difficult for the user to determine whether the output catch-phrase is good or bad (hereinafter referred to as "the impression of the catch-phrase"). In particular, when there is a plurality of catch-phrases that meet the user's expectations, it becomes easier for the user to select a catch-phrase if there is an objective index representing the impression of each catch-phrase.

Therefore, before generating a catch-phrase corresponding to one or more user words received by the generation model 17, the CPU 21 outputs the details of a descriptive text estimated by the descriptive text estimation model for every received user word. In response to this, the user selects a descriptive text that most correctly expresses the matter for which a catch-phrase is to be generated, in accordance with the details of the output descriptive text. The CPU 21 inputs a user word used for estimating the selected descriptive text to the generation model 17 to generate a catch-phrase. Because the generated catch-phrase is a catch-phrase generated from a user word used for generating a descriptive text that most correctly represents the matter for which a catch-phrase is to be generated, a catch-phrase that meets the user's expectations is obtained.

Information output by the output apparatus 10 to the user in response to an input of one or more user words includes various types of information. Hereinafter, information output by the output apparatus 10 will be described. As described above, there is no restriction on the form of outputting information by the output apparatus 10. Here, an example in which, for example, information is visually output through a screen displayed on a liquid crystal display will be described by way of example.

There is a tendency that, the greater the number of user words input to the output apparatus 10, the more specific the details of a catch-phrase associated with the user words becomes, and a catch-phrase that meets the user's expectations is generated. However, in the case where similar user words are input to the generation model 17, the viewpoint and degree of impact of these similar user words on generating a catch-phrase exhibit the same tendency. As a result, the generated catch-phrases have similar expressions. That is, even if the number of user words input to the output apparatus 10 is increased, when the input user words include user words that have similar expressions, the generated catch-phrase may be similar to a catch-phrase generated from fewer user words than the input user words.

Therefore, the CPU 21 may output a warning on receipt of a user word whose similarity with an already-input user word is greater than or equal to a reference similarity. Specifically, on receipt of user words with distributed representations whose distance is less than or equal to a reference distance, the CPU 21 outputs a warning for either of the user words.

Figure 9:
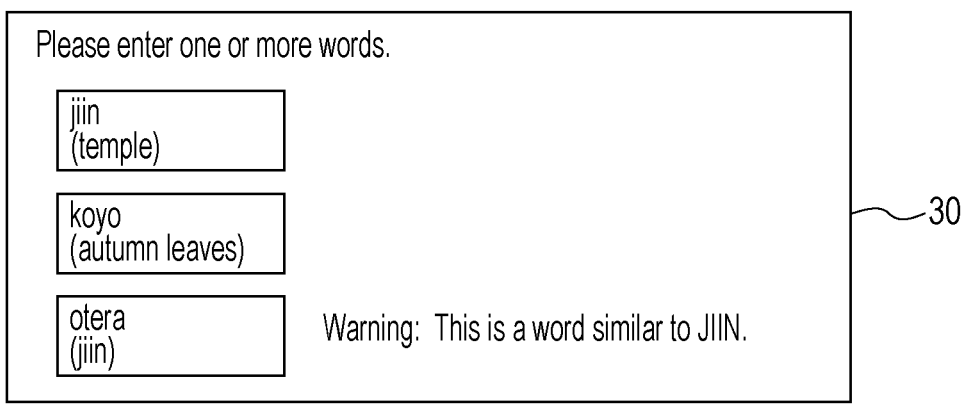
FIG. 9 is a diagram illustrating an exemplary entering screen in the case where similar user words are entered.

FIG. 9 is a diagram illustrating an example of a user word entering screen 30. In the example illustrated in FIG. 9, the user enters three user words, namely, "jiin (temple)", "koyo (autumn leaves)", and "otera (temple)", on the entering screen 30. In the case where the distance between the distributed representations of "jiin (temple)" and "otera (temple)" is less than or equal to a reference distance, meaning that "jiin (temple)" and "otera (temple)" are similar expressions, when "otera (temple)" is entered, the CPU 21 outputs a warning such as "Warning: This word is similar to jiin (temple)" to notify the user that "otera (temple)" is an unnecessary user word. Needless to say, a warning may be output not for "otera (temple)" but for "jiin (temple)" which is entered first.

Figure 10:
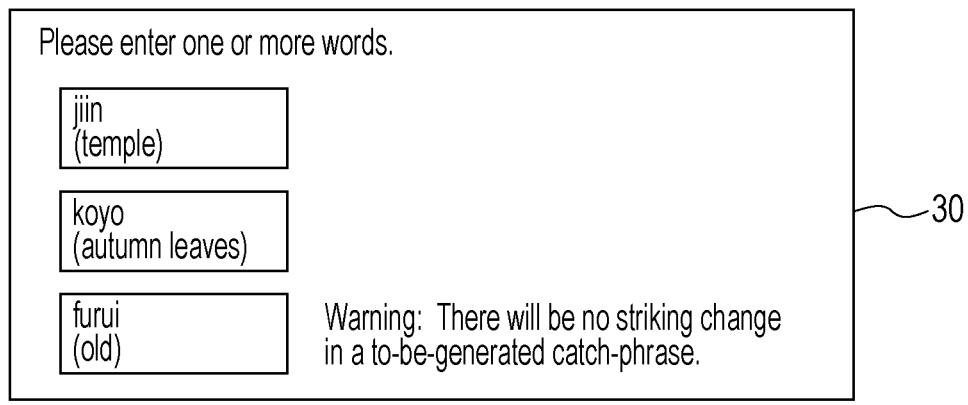
FIG. 10 is a diagram illustrating an exemplary entering screen in the case where a user word that has no influence on generating a catch-phrase is entered.

FIG. 10 is also a diagram illustrating an example of the user word entering screen 30. In the example illustrated in FIG. 10, the user enters three user words, namely, "jiin (temple)", "koyo (autumn leaves)", and "furui (old")", on the entering screen 30. The CPU 21 determines whether the similarity between a catch-phrase generated by the generation model 17 using the combination of "jiin (temple)" and "koyo (autumn leaves)" and a catch-phrase generated by the generation model 17 using the combination of "jiin (temple)", "koyo (autumn leaves)", and "furui (old)" is greater than or equal to a reference similarity. In the case where the similarity between the catch-phrases is greater than or equal to the reference similarity, the CPU 21 outputs a warning such as "Warning: There is no striking change in a to-be-generated catch-phrase" to notify the user that there is no striking change in a to-be-generated catch-phrase whether or not "furui (old)" is entered as a user word.

Although the example of the output apparatus 10 which outputs a warning by paying attention to the similarity between input user words and the similarity between generated catch-phrases has been described above, among user words, there is a word that is less related to a catch-phrase than a feature term, such as a word not extracted as a feature term from a descriptive text (referred to as an "unextracted word"). Specifically, words whose part of speech is noun, adjective, adverb, and verb express the features of a matter in many cases. In contrast, words whose part of speech is conjunction, particle, and auxiliary verb do not express the features of a matter by themselves, and are rarely extracted as feature terms.

Therefore, in the case of extracting feature terms from the descriptive text in step S30 of FIG. 3, the CPU 21 may store unextracted words that are not extracted as feature terms, and, if received user words contain an unextracted word, the CPU 21 may output a warning.

Figure 11:
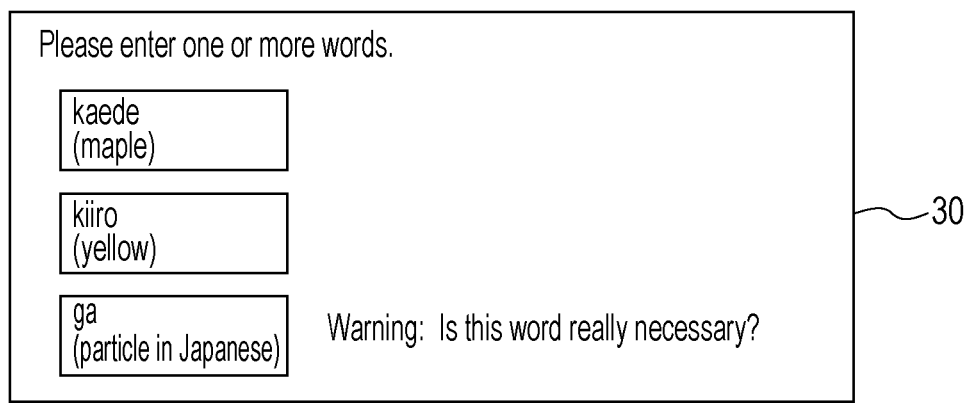
FIG. 11 is a diagram illustrating an exemplary entering screen in the case where an unextracted word is included in user words.

FIG. 11 is a diagram illustrating an example of the user word entering screen 30. In the example illustrated in FIG. 11, the user enters three user words, namely, "kaede (maple)", "kiiro (yellow)", and "ga (particle in Japanese)", on the entering screen 30. Among these user words, the CPU 21 outputs a warning such as "Warning: Is this word really necessary?" for the user word "ga (particle in Japanese)", which is determined as an unextracted word, to prompt the user to reconsider whether "ga (particle in Japanese)" is a useful user word for generating a catch-phrase.

Although the example in which a warning is output in accordance with the result of determining whether a user word is an unextracted word has been described above, as already explained, words whose part of speech is conjunction, particle, and auxiliary verb are rarely extracted as feature terms. Therefore, parts of speech corresponding to unextracted words may be set in advance, and the CPU 21 may determine whether a received user word is an unextracted word on the basis of the part of the speech of the user word. In this case, whether a user word is an unextracted word may be determined without collecting and storing in advance unextracted words. Note that a known analysis method is used for analyzing the part of speech of a user word.

The CPU 21 may not only output a warning for an unextracted word, but also delete an unextracted word from user words, input only the remaining user word(s) to the generation model 17 to generate a catch-phrase, and output the generated catch-phrase.

In the case where one or more received user words include an unlearned word that has not been used for training the generation model 17, because the impact of an unlearned word on generating a catch-phrase by the generation model 17 is unknown, a catch-phrase that meets the user's expectations may not be generated. Therefore, in such a case, the CPU 21 notifies the user that the received user word(s) include(s) an unlearned word. The CPU 21 determines whether a received user word is an unlearned word by, for example, storing feature terms in training data used for training the generation model 17 in the non-volatile memory 24 or an external storage device connected to the Internet.

After notifying the user that the received user word(s) include(s) an unlearned word, the CPU 21 may delete the unlearned word from the user word(s), input only the remaining user word(s) to the generation model 17 to generate a catch-phrase, and output the generated catch-phrase.

In addition, in the case where a received user word(s) include(s) an unlearned word, the CPU 21 may replace the unlearned word by a word that has been used for training the generation model 17 and whose similarity with the unlearned word is greater than or equal to a predetermined value, input the replacing word to the generation model 17, and output a catch-phrase corresponding to the user words including the replacing word.

In this manner, the CPU 21 displays whether a received user word(s) is/are a useful user word(s) that has/have at least a certain impact on generating a catch-phrase before outputting a catch-phrase to the user, and supports the user in inputting an appropriate user word(s) to the output apparatus 10.

Furthermore, in the case of outputting a plurality of catch-phrases on an output screen 32 that are generated from a user word(s) using the generation model 17, the CPU 21 may additionally output the amount of attention drawn to each of the catch-phrases. The amount of attention drawn to a catch-phrase represents at least one of how much the catch-phrase is exposed to public view, and how long the catch-phrase is exposed to public view. In the case of posting a catch-phrase generated by the output apparatus 10 on a web page such as a blog, the amount of attention drawn to the catch-phrase is represented by the number of views of the web page posting the catch-phrase.

Since a catch-phrase output by the output apparatus 10 is a catch-phrase before being posted on a web page, the number of views in the case where the catch-phrase is posted on a web page is unknown. However, when the output apparatus 10 includes in advance a number-of-view estimation model trained on the correspondence between existing catch-phrases already posted on web pages and the number of views of these existing catch-phrases posted on web pages, and, in response to an input of a catch-phrase generated by the generation model 17 to the number-of-view estimation model, the number of views in the case where the catch-phrase generated by the generation model 17 is posted on a web page is obtained. The CPU 21 may simply output the number of views estimated by the number-of-view estimation model as the amount of attention drawn to the catch-phrase generated by the generation model 17.

Figure 12:
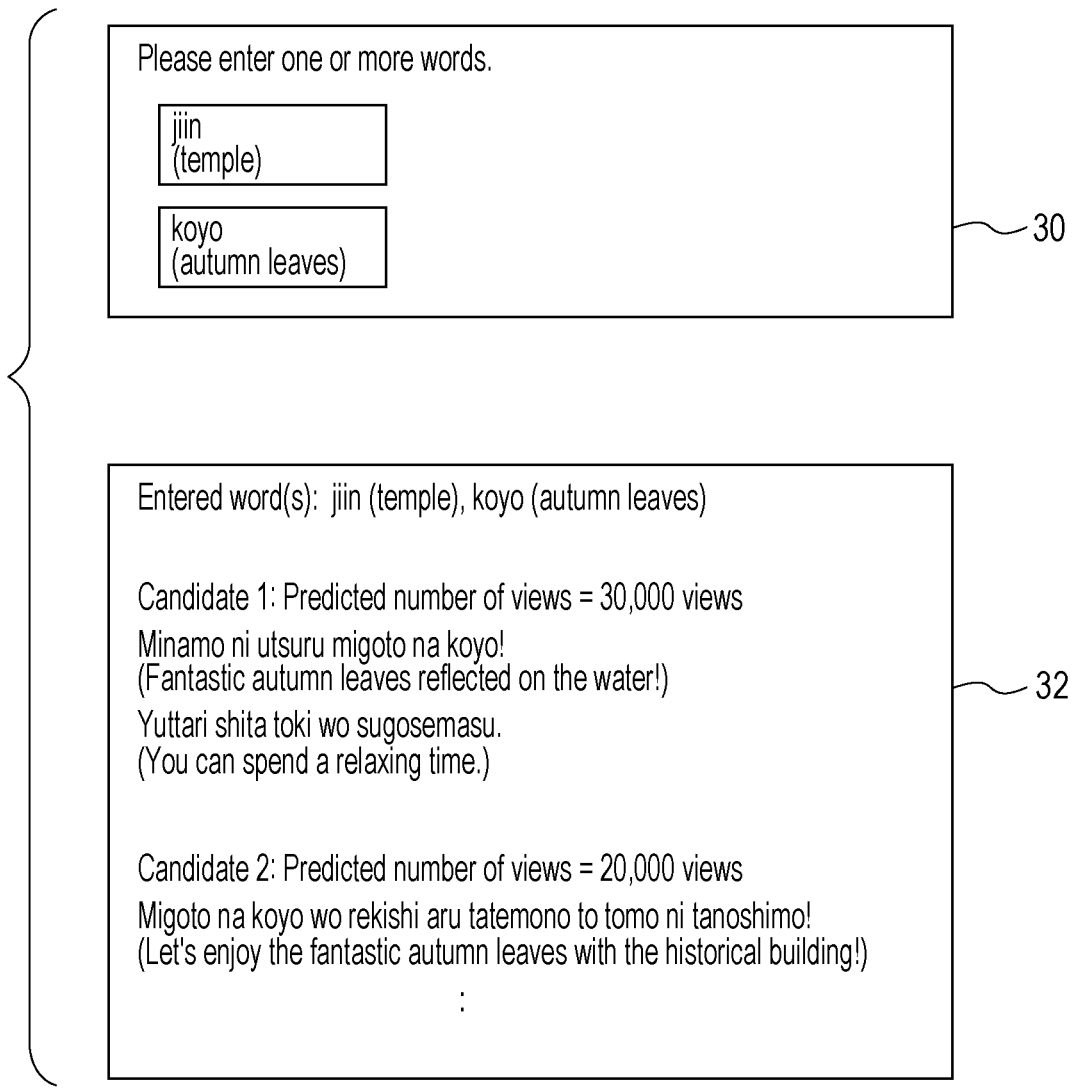
FIG. 12 is a diagram illustrating an exemplary output screen for outputting the amount of attention drawn to each catch-phrase.

FIG. 12 is a diagram illustrating an example of the output screen 32 for outputting the amount of attention drawn to each catch-phrase along with the catch-phrase. In the example illustrated in FIG. 12, an estimated value is indicated that the predicted number of views is 30000 for a catch-phrase candidate 1, and an estimated value is indicated that the predicted number of views is 20000 for a catch-phrase candidate 2.

Because the amount of attention is added to a catch-phrase, even in the case where the output apparatus 10 outputs a plurality of catch-phrases and the user is confused about which catch-phrase to adopt, it becomes easier for the user to select a catch-phrase by if the user refers to the predicted number of views.

In the case where the CPU 21 adds the predicted number of views to each of a plurality of catch-phrases in order to facilitate the selection of a catch-phrase by the user, the CPU 21 may rearrange the order of outputting the catch-phrases according to the predicted number of views. For example, the CPU 21 controls the position of displaying catch-phrases such that catch-phrases with a greater number of predicted views will be displayed at the top of the output screen 32.

Although the amount of attention drawn to a catch-phrase is represented using the number of views of a web page here by way of example, the amount of attention drawn to a catch-phrase generated by the generation model 17 may be estimated using an estimation model trained on, for example, the relationship between a catch-phrase for a product and the sales of the product, the relationship between a catch-phrase for an event and the number of participants in the event, or the relationship between a catch-phrase for a product or an event and the number of posts on SNS regarding the product or the event.

An estimation model for estimating the amount of attention drawn to a catch-phrase may be built in the output apparatus 10; however, the CPU 21 may output, as the amount of attention drawn to a catch-phrase, an output from the output unit 29 which is obtained by inputting a catch-phrase generated by the generation model 17 to an estimation model built in, for example, an external device connected to the Internet via the communication unit 27.

Furthermore, the CPU 21 may output, along with a catch-phrase generated by the generation model 17, the degree of perfection of the catch-phrase estimated by the above-described degree-of-perfection estimation model on the output screen 32.

It has been described as above that the greater the ROUGE score of a generated catch-phrase, the higher degree of perfection of the catch-phrase. From another point of view, this means that there is an existing catch-phrase similar to the generated catch-phrase. There is a risk of copyright infringement if catch-phrases are too similar. Thus, in the case where the ROUGE score of a catch-phrase generated by the generation model 17 exceeds a predetermined maximum value, the CPU 21 preferably outputs a warning prompting the user to correct the generated catch-phrase.

FIG. 13 is a diagram illustrating an example of the output screen 32 for prompting the user to correct a catch-phrase. In the example illustrated in FIG. 13, it is warned that the catch-phrase candidate 2 "Let's enjoy the fantastic autumn leaves with the historical building!" generated by the generation model 17 is similar to the catch-phrase "Let's enjoy the fantastic autumn leaves with the building!" posted on a poster created by Company Z in 2018. In this manner, the output apparatus 10 may output not only the details of a similar catch-phrase, but also its source information as well on the output screen 32. To output a similar catch-phrase including its source information, the CPU 21 simply stores catch-phrases used for training the generation model 17, as well as catch-phrases collected from various web pages and their source information in relation to the catch-phrases.

The output apparatus 10 which generates a catch-phrase from a user word has been described so far. An associative text output by the output apparatus 10 is not restricted to a catch-phrase, and may be any sentence as long as it is associated with a user word.

For example, the output apparatus 10 may associate and output a matter itself that is expressed by a received user word, as in the case of a question and its answer in a quiz. Specifically, when the user inputs "America", "sixth", and "president" as user words to the output apparatus 10, the output apparatus 10 outputs the answer "John Quincy Adams" as an associative text. As described here, feature terms and a matter itself represented by the feature terms may be used for training the generation model 17. With such training of the generation model 17, the output apparatus 10 is able to grasp the details of the user's command. For example, the output apparatus 10 may be configured to, for example, from words spoken by the user, search for information using the Internet or execute particular processing such as turning on/off the power of air conditioning.

In addition, the output apparatus 10 according to the present exemplary embodiment is usable as an apparatus that, in response to an input of one or more words, generates a sentence associated with the word(s) and automatically generates text such as a report or an email message. Specifically, the output apparatus 10 includes a descriptive text estimation model trained on the relation between feature terms extracted from a descriptive text and the descriptive text from which the feature terms are extracted. In the case where the user inputs user words including "9 o'clock", "failure", and "contact" to the output apparatus 10, the output apparatus 10 inputs the received user words to the descriptive text estimation model to generate a report such as "We would like to report as follows. Regarding the subject . . . A customer has contacted us at 9 o'clock regarding a failure . . . ".

Although the exemplary embodiment of the present disclosure has been described as above, the present disclosure is not limited to the range described in the exemplary embodiment. Various changes or modifications may be added to the exemplary embodiment without departing from the scope of the present disclosure. A mode to which the changes or modifications are added is also included in the technical scope of the present disclosure. For example, the order of processes may be changed without departing from the gist of the present disclosure.

Although the mode in which the training process and the output process are implemented by software has been described in the present exemplary embodiment, processes equivalent to the flowcharts illustrated in FIGS. 3 and 8 may be performed by hardware using, for example, an application specific integrated circuit (ASIC), a field programmable gate array (FPGA), or a programmable logic device (PLD). In this case, the processes may be speeded up, compared with the case where the processes are implemented by software.

In this manner, the CPU 21 may be replaced with a dedicated processor specialized for specific processing, such as an ASIC, an FPGA, a PLD, a graphics processing unit (GPU), or a floating point unit (FPU).

The operation of the CPU 21 in the present exemplary embodiment may be implemented not only by one CPU 21, but also by a plurality of CPUs 21. Furthermore, the operation of the CPU 21 in the present exemplary embodiment may be implemented by cooperation of the CPUs 21 in the computers 20 located at physically separated positions.

Although the mode in which the output program is installed in the ROM 22 has been described in the above-described exemplary embodiment, the storage of the output program is not restricted to the ROM 22. The output program according to the exemplary embodiment may be provided by being recorded in a computer readable storage medium. For example, the output program may be provided by being recorded in optical discs such as a compact-disc (CD)-ROM or a digital versatile disc (DVD). In addition, different programs according to the present exemplary embodiment may be provided by being recorded in portable semiconductor memory such as a universal serial bus (USB) flash drive or a memory card.

Furthermore, the output apparatus 10 may obtain the output program according to the present disclosure via the communication unit 27 from an external apparatus connected to the Internet.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An output apparatus comprising:
   a processor configured to
      receive an input word expressing a feature of a matter;
      by inputting the input word to a generation model trained on relation between a feature term extracted based on a descriptive text describing the matter and an associative text associated with the matter, the associative text being generated from the descriptive text describing the matter, output an associative text corresponding to the input word;
      outputting impact of each word or phrase included in a descriptive text on an associative text through a different generation model including an attention mechanism; and
      extract one or more words or phrases included in the descriptive text as one or more feature terms, the one or more words or phrases being selected in descending order of impact on an associative text.

2. The output apparatus according to claim 1, wherein:
   in a case where there is feature term information that is generated in a course of training the different generation model for generating the associative text from the descriptive text and that defines a feature term in the descriptive text, the processor is configured to refer to the feature term information and extract the feature term from the descriptive text, and
   in a case where there is no feature term information, the processor is configured to calculate importance of each word or phrase included in the descriptive text from details of the descriptive text, and extract the feature term in accordance with the importance of each word or phrase.

3. The output apparatus according to claim 2, wherein the processor is configured to determine input order of inputting one or more feature terms to the generation model in accordance with importance of the one or more feature terms or impact of the one or more feature terms on an associative text.

4. The output apparatus according to claim 2, wherein, using an estimation model for outputting an estimated sentence that contains estimated details of a descriptive text from a feature term, the processor is configured to output an estimated sentence estimated from the input word.

5. The output apparatus according to claim 2, wherein the processor is configured to refer to total information that totals a number of appearances of every word or phrase used in a descriptive text including the input word; calculate, for each of a plurality of associative texts obtained in a case where a combination of the input word and a word or a phrase other than the input word is input to the generation model, similarity with a reference associative text generated in a case where a combination of the input word and a word or a phrase with a greatest number of appearances is input to the generation model; and, using the similarity with the reference associative text, select a related word related to the input word received from a user.

6. The output apparatus according to claim 1, wherein the processor is configured to correct the impact on association in accordance with a user's command.

7. The output apparatus according to claim 6, wherein the processor is configured to determine input order of inputting one or more feature terms to the generation model in accordance with importance of the one or more feature terms or impact of the one or more feature terms on an associative text.

8. The output apparatus according to claim 6, wherein, using an estimation model for outputting an estimated sentence that contains estimated details of a descriptive text from a feature term, the processor is configured to output an estimated sentence estimated from the input word.

9. The output apparatus according to claim 1, wherein the processor is configured to extract, as a feature term, a combination of words or phrases causing a smaller loss indicating an error between an associative text generated by the generation model and an associative text related in advance to the descriptive text, the loss being obtained in a course of training the generation model trained to generate, for an input feature term, an associative text related in advance to the descriptive text.

10. The output apparatus according to claim 9, wherein:
    the generation model includes a decoder, and
    the processor is configured to extract, as a feature term, a combination of a word or a phrase included in the descriptive text, and, among words or phrases included in the decoder, a word or a phrase that is not included in the descriptive text.

11. The output apparatus according to claim 1, wherein the processor is configured to determine input order of inputting one or more feature terms to the generation model in accordance with importance of the one or more feature terms or impact of the one or more feature terms on an associative text.

12. The output apparatus according to claim 11, wherein the processor is configured to input one or more feature terms to the generation model in descending order of importance of the one or more feature terms or impact of the one or more feature terms on an associative text.

13. The output apparatus according to claim 1, wherein, using an estimation model for outputting an estimated sentence that contains estimated details of a descriptive text from a feature term, the processor is configured to output an estimated sentence estimated from the input word.

14. The output apparatus according to claim 13, wherein:
    the processor is configured to output an estimated sentence for every input word received from a user, and
    by inputting an input word corresponding to an estimated sentence selected by the user from among a plurality of the estimated sentences to the generation model, the processor is configured to output an associative text generated for the input word.

15. The output apparatus according to claim 1, wherein the processor is configured to refer to total information that totals a number of appearances of every word or phrase used in a descriptive text including the input word; calculate, for each of a plurality of associative texts obtained in a case where a combination of the input word and a word or a phrase other than the input word is input to the generation model, similarity with a reference associative text generated in a case where a combination of the input word and a word or a phrase with a greatest number of appearances is input to the generation model; and, using the similarity with the reference associative text, select a related word related to the input word received from a user.

16. The output apparatus according to claim 15, wherein the processor is configured to select a predetermined number of associative texts in ascending order of similarity with the reference associative text, and output, as one or more related words, one or more words or phrases other than the input word that correspond to the selected associative text or texts.

17. A non-transitory computer readable medium storing an output program causing a computer to execute a process, the process comprising:
  receiving an input word expressing a feature of a matter;
  by inputting the input word to a generation model trained on relation between a feature term extracted based on a descriptive text describing the matter and an associative text associated with the matter, the associative text being generated from the descriptive text describing the matter, outputting an associative text corresponding to the input word;
  outputting impact of each word or phrase included in a descriptive text on an associative text through a different generation model including an attention mechanism; and
  extracting one or more words or phrases included in the descriptive text as one or more feature terms, the one or more words or phrases being selected in descending order of impact on an associative text.

18. An output apparatus comprising:
  a processor configured to
    receive an input word expressing a feature of a matter;
    by inputting the input word to a generation model trained on relation between a feature term extracted based on a descriptive text describing the matter and an associative text associated with the matter, the associative text being generated from the descriptive text describing the matter, output an associative text corresponding to the input word; and
    outputting a warning in a case where a feature of the input word satisfies a predetermined condition,
    wherein the predetermined condition comprises a similarity between the input word with an already-input word being greater than or equal to a reference similarity, a similarity between catch-phrases generated by the generation model being greater than or equal to a reference similarity, or an unextracted word being contained.

* * * * *